(No Model.)
H. WYMAN.
SHUTTLE MOTION FOR LOOMS.
No. 503,924. Patented Aug. 22, 1893.
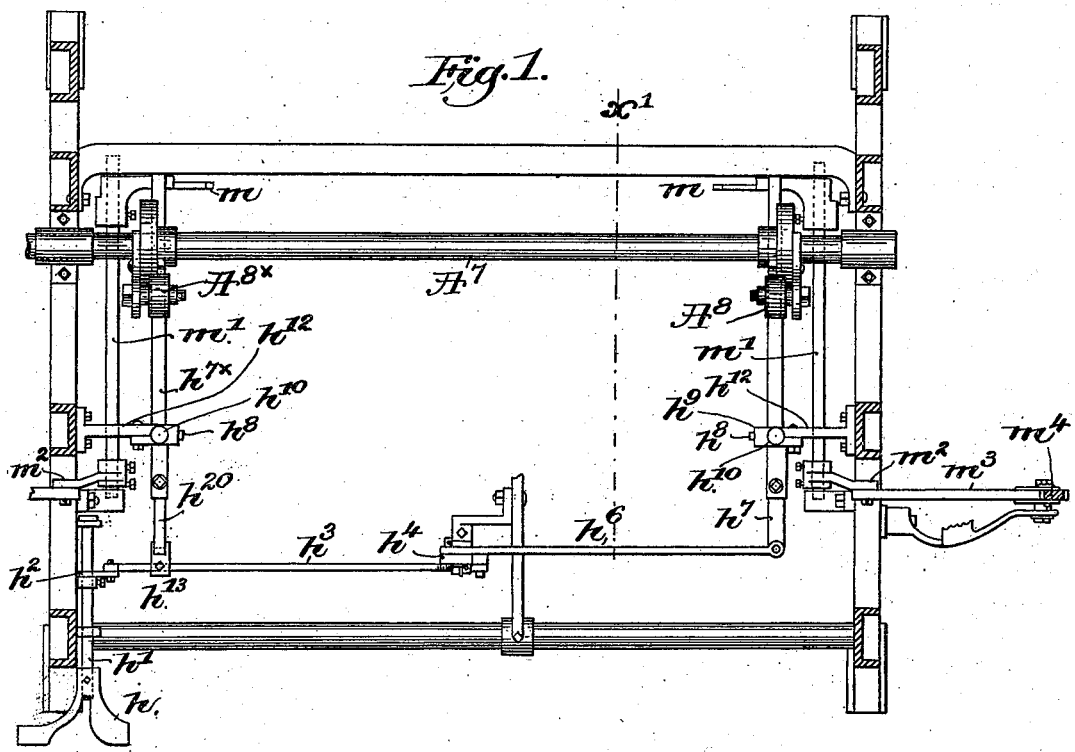
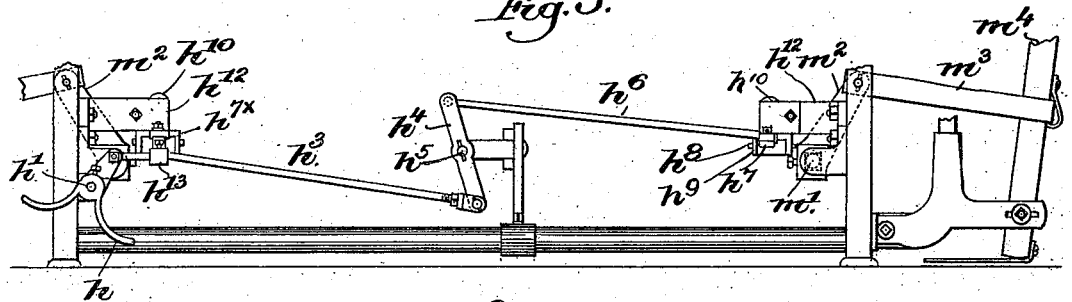
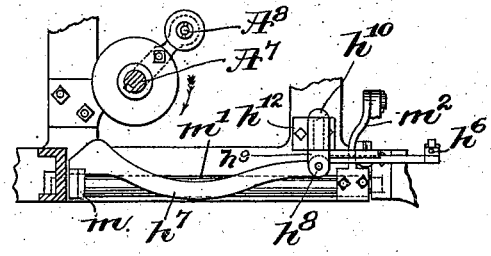
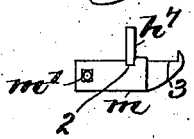
Witnesses.
Louis N. Gowell
Fred S. Greenleaf
Inventor.
Horace Wyman.
by Crosby & Gregory
Attys.

UNITED STATES PATENT OFFICE.

HORACE WYMAN, OF WORCESTER, MASSACHUSETTS, ASSIGNOR TO THE CROMPTON LOOM WORKS, OF SAME PLACE.

SHUTTLE-MOTION FOR LOOMS.

SPECIFICATION forming part of Letters Patent No. 503,924, dated August 22, 1893.

Application filed November 5, 1892. Serial No. 451,123. (No model.)

*To all whom it may concern:*

Be it known that I, HORACE WYMAN, of Worcester, county of Worcester, State of Massachusetts, have invented an Improvement in Shuttle-Motions for Looms, of which the following description, in connection with the accompanying drawings, is a specification, like letters and figures on the drawings representing like parts.

The invention to be herein described has for its object the production of an improved mechanism whereby the operation of the picking sticks may be carried on with less wear and friction, and with less strain upon the working parts of the loom, and also whereby at any desired time the picking operation may be suspended.

It is customary in power looms to actuate the picker stick from what is called the picker rock shaft, it having an arm which is connected by a strap, or otherwise, with the usual picker stick. This picker rock shaft usually has a rigidly attached laterally extended wing which is acted upon by a cam carried by the under or cam-shaft, said cam in operation moving the wing in advance of it in the arc of a circle.

Where a cam rotates, as described, in a vertical plane and acts on a wing having a pivot at right angles to the center of rotation of the cam, the cam is dragged across the wing, and the wing and cam are unduly worn and at the same time power is lost by the resultant friction.

In my experiments seeking to improve the picking devices, I have devised a construction whereby the picker rock shaft is retained, but its usual rigid wings are dispensed with.

My invention consists essentially in combining with a horizontally placed picker rock shaft a horizontally placed sweep lever mounted to turn on a horizontal fulcrum on one end of said sweep lever, said sweep lever when being acted upon by the cam moving in a vertical plane at right angles to the center of rotation of the cam shaft, said sweep lever in its movement acting on a projection carried by the picker rock shaft and turning the latter, but in case the relative position of the said cam, sweep lever, and projection are changed, as they may be whenever desired, the cam may rotate and yet not effect the rocking of the picker rock shaft, and consequently the shuttle will not be thrown.

Figure 1 represents a sufficient portion of a loom to illustrate one practical form or embodiment of my invention, said figure being a horizontal section about midway the breast beam and the foot of the loom frame, the picker sticks and frame work being in section, part of the loom at the left-hand side thereof being omitted. Fig. 2 is a section in the line $x'$, Fig. 1, looking to the right; Fig. 3, a front elevation of the parts shown in Fig. 1, and Fig. 4 is a detail to be referred to.

Referring to the drawings, $h$ represents a treadle fast on a rock shaft $h'$ supported in suitable bearings and having a crank $h^2$ to which is jointed a link $h^3$, said link in turn being jointed to one end of a lever $h^4$ pivoted at $h^5$, a second like link $h^6$ also jointed to the lever $h^4$ being jointed to one end of a sweep lever $h^7$ mounted upon a horizontal pivot $h^8$ so that the said sweep lever may rise and fall about said pivot when acted upon by the cam device $A^8$ herein represented as a roll, said cam device being carried by the under or cam shaft $A^7$ of the loom.

Instead of the particular cam device to act upon the sweep lever I may employ any other usual or equivalent picker cam device, the roll being employed simply to avoid friction; but instead of the roll of the particular shape shown I may employ any other roll commonly used as an intermediate device between the cam shaft $A^7$ and a picker rock shaft to avoid friction. In this instance of my invention I have shown the pivot $h^8$ as carried in ears of a stand $h^9$ having a vertical post or part marked $h^{10}$ which is pivotally mounted in a bearing of a stand $h^{12}$ secured to and projecting inwardly from the loom side. The link $h^3$ has a lug $h^{13}$ provided, as shown in Fig. 1, with a suitable notch or projection to receive a suitable lug as $h^{20}$ extended downwardly from one end of a second sweep lever $h^{7\times}$ this latter lever being mounted in manner described of the sweep lever $h^7$, the sweep lever $h^{7\times}$ being operated in like manner by a suitable cam $A^{8\times}$.

The sweep levers described have, in this instance of my invention, a substantially universal pivot, and by the rock shaft $h'$, and links and levers described the said sweep levers may have their positions changed relatively to the cams for moving them so that in one position the cams will operate the sweep levers and in another position will leave them at rest. The faces of these levers against which the cams referred to act present an extended contact surface for the cams so that the friction between the cams and sweep levers is reduced to a minimum and side thrust or drag is obviated, the motion being a long steady sweep thus positively turning the picker rock-shafts $m'$ steadily.

The picker rock shafts have secured to them arms $m$, one of which is shown detached in Fig. 4, said arms having two notches 2, 3, the notch 2 being shown as occupied by the sweep lever. When the sweep lever is in the position shown in Fig. 1, it is in the line or path of movement of the cam $A^8$ of whatever form used, and during the rotation of the shaft $A^7$ the arm $m$ will be depressed to rock the picker rock shaft, and through its connecting arm $m^2$ with the strap $m^3$ actuate the picker stick $m^4$, which latter may be of any usual or suitable construction. By changing the relative positions, however, of the parts $m$, $h^7$ and $A^8$, so that, for instance, the lever $h^7$ rests in the notch 3, then the cam shaft $A^7$ may rotate and its cams will not effect the rocking of the picker rock shaft and consequently the picker sticks will not be actuated and the shuttle will not be thrown.

Believing myself to be the first to pivot upon or with relation to the usual picker rock shaft a lever to be actuated by a suitable cam or projection carried by the cam shaft $A^7$ to effect the picking operation, this invention is not limited to the precise construction of mechanism shown, but instead I may employ any other equivalent mechanism or devices wherein the sweep lever may rise and fall, and also move in the arc of a vertical circle when being acted upon by the cam or projection carried by the shaft $A^7$, the parts having such construction as to enable the picking to be suspended when desired by a change in the relative position of the parts, so that as both the cam shaft $A^7$ and its cam projection continues to rotate the picker rock shaft will not be moved.

I have illustrated my invention as applied to a loom of the kind shown in Patent No. 498,417, dated May 30, 1893, the cam shaft in that application being adapted to rotate in unison with the crank shaft.

The projections, such as rolls $A^8$ may be here applied to the cam shaft $A^7$, if desired, in the loom in which my invention should be used, so that the sweep levers would be acted upon each by two rolls rather than one, that depending entirely upon the relative speeds of the cam shaft and crank shaft.

Having described my invention, what I claim as new, and desire to secure by Letters Patent, is—

1. In a loom the following instrumentalities, viz:—a rotating cam shaft, provided with picker cam or projection; a horizontally placed picker rock shaft; a horizontally placed sweep lever mounted to turn on a horizontal fulcrum near one end of said sweep lever, and to be moved by the said cam or projection in a vertical plane at right angles to the center of rotation of the said cam shaft; and an arm or connection extended from said picker rock shaft and cooperatively connected with the said sweep lever near the opposite end to that provided with the said horizontal fulcrum, the combination being, and to operate, substantially as described.

2. In a picking mechanism for looms, a cam shaft; a horizontally placed picker rock shaft; connections between the latter shaft and a picker stick to actuate the stick; a horizontally placed sweep lever mounted on a pivot and disconnected from the picker rock shaft; an arm extended from said picker rock shaft in the path of movement of said sweep lever, and devices between said cam shaft and sweep lever to actuate the same and effect the rocking of the picker rock shaft, substantially as described.

3. In a picker mechanism for looms, a cam shaft; a horizontally placed picker rock shaft; connections between the latter shaft and a picker stick to actuate the stick; a horizontally placed sweep lever mounted near one end on a horizontal pivot independent of and disconnected from the picker rock shaft; an arm extended from said picker rock shaft in the path of movement of that end of said sweep lever most remote from said horizontal pivot, and devices between said cam shaft and sweep lever to actuate the same and effect the rocking of the picker rock shaft; and devices to effect the relative change of position of said sweep lever and arm with relation to the path of the projection on the cam shaft for causing the picker rock shaft to be turned whereby the cam shaft may be rotated and yet the picker rock shaft will not be rocked as when it is desired to stop the picking operation, substantially as described.

In testimony whereof I have signed my name to this specification in the presence of two subscribing witnesses.

HORACE WYMAN.

Witnesses:
JUSTIN A. WARE,
SAMUEL B. SCHOFIELD.